US008792383B2

(12) United States Patent
Moreno Carbonel et al.

(10) Patent No.: US 8,792,383 B2
(45) Date of Patent: Jul. 29, 2014

(54) DIGITAL COMMUNICATIONS SYSTEM FOR RESIDENTIAL AND CUSTODIAL-CARE ENVIRONMENTS, OFFICE AND THE LIKE

(75) Inventors: Juan Carlos Moreno Carbonel, Zaragoza (ES); Jorge Leza Espanol, Logrono (ES)

(73) Assignee: Universidad de Zaragoza, Zaragoza (ES)

( * ) Notice: Subject to any disclaimer, the term of this patent is extended or adjusted under 35 U.S.C. 154(b) by 756 days.

(21) Appl. No.: 12/225,032

(22) PCT Filed: Feb. 23, 2007

(86) PCT No.: PCT/ES2007/000104
§ 371 (c)(1),
(2), (4) Date: Sep. 12, 2008

(87) PCT Pub. No.: WO2007/104810
PCT Pub. Date: Sep. 20, 2007

(65) Prior Publication Data
US 2009/0116408 A1 May 7, 2009

(30) Foreign Application Priority Data

Mar. 14, 2006 (ES) .................................. 200600740

(51) Int. Cl.
*H04L 12/28* (2006.01)
(52) U.S. Cl.
USPC ........ 370/254; 340/870.09; 340/901; 379/44; 379/50
(58) Field of Classification Search
USPC ........ 370/254; 379/37–56.3; 340/870.09, 901
See application file for complete search history.

(56) References Cited

U.S. PATENT DOCUMENTS

| 4,320,394 | A | * | 3/1982 | John, Jr. ........................ 340/618 |
| 5,282,198 | A | | 1/1994 | Punj |
| 5,517,549 | A | * | 5/1996 | Lee ............................... 455/407 |
| 5,651,003 | A | * | 7/1997 | Pearce et al. ............. 370/395.71 |

(Continued)

FOREIGN PATENT DOCUMENTS

WO WO 2004/049635 6/2004

OTHER PUBLICATIONS

Horacio D. Vallejo, "PLC, Los controladores programables", Sabeer Electronica No. 166, Jun. 15, 2003, retrieved from <URL:http://www.thewholepic.com.ar/utiles/PLC.pdf>.

*Primary Examiner* — Un C Cho
*Assistant Examiner* — Siming Liu
(74) *Attorney, Agent, or Firm* — DLA Piper LLP (US)

(57) ABSTRACT

The system is based on the arrangement of a plurality of terminals (1), (I') ... (I"), which are interconnected with one another to form a digital network by means of two databuses, one write and one read, by means of differential transmission, with a hybrid connection topology based inter alia on UTP-type cables (4). Each terminal is constituted by a DLP-type card (7), which contains a programmable logic device for the management of a series of cards associated with the card (7), said cards being a main card (8) and a user-interface card (9), which enable the user to configure the various system options, it being possible, also, to incorporate one or more extension cards (H-H') for the input and output of audio/video signals, the Internet, a telephone line or an automatic-door-entry line, and also a remote-control and alarm card (10) for activating external loads, activating alarms and receiving signals originating from sensors.

1 Claim, 2 Drawing Sheets

(56) References Cited

U.S. PATENT DOCUMENTS

| | | | |
|---|---|---|---|
| 6,111,733 A * | 8/2000 | Neiger et al. | 361/42 |
| 6,370,586 B2 * | 4/2002 | Davis et al. | 709/244 |
| 2004/0028207 A1 * | 2/2004 | Kato | 379/219 |
| 2005/0085928 A1 | 4/2005 | Shani | |
| 2005/0131551 A1 | 6/2005 | Ruutu et al. | |
| 2005/0168333 A1 * | 8/2005 | Cronin | 340/501 |
| 2005/0275558 A1 * | 12/2005 | Papadimitriou et al. | 340/692 |
| 2006/0251115 A1 * | 11/2006 | Haque et al. | 370/466 |

\* cited by examiner

DIGITAL COMMUNICATIONS SYSTEM FOR RESIDENTIAL AND CUSTODIAL-CARE ENVIRONMENTS, OFFICE AND THE LIKE

FIELD OF THE INVENTION

This invention is related to a digital communication system that has been specially designed to replace signal distribution systems in residential, custodial-care environments, office and the like, with the purpose of avoiding the installation of different voice, video, entryphone, Internet, piped music and alarm traffic networks, including heating and air-conditioning control systems and the activation of the different electrical devices.

The object of this invention is to provide a versatile system that replaces the abovementioned networks grouping them in a single network, this system being simple, reliable, easily adaptable, reusable, with a minimum implementation cost and very easy to install.

BACKGROUND OF THE INVENTION

The use of communication networks is currently widespread and we can classify them in two major types: branch and ring-shaped networks.

However, even though ring-shaped networks retain the network's functionality between terminals in case of a linking failure, this type of topology is usually more difficult than a branch-type network because of the this topology itself, which requires a closed link between all terminals forming the network.

On the other hand, current communication networks used in residential, custodial-care environments, office and the like are designed to integrate two or more services such as voice traffic, piped music, data transmission, etc, so that their design is usually tailored for such purposes, meaning that they are expensive, hard to modify and/or update in case of requiring new services or expanding the network.

DESCRIPTION OF THE INVENTION

The communications system for homes, offices and similar environments according to the invention provides a fully satisfactory solution to the abovementioned problems, providing by using a single installation the internal and external traffic of voice, piped music, alarm system and temperature sensors for the management of heating and air-conditioning systems to each terminal, including the remote control of different devices associated to the terminal and the transmission of video signals, being communications optionally encrypted and optionally using compression procedures for the information.

In particular, the system according to the invention is based on a multiple terminal arrangement, where terminals are interconnected to form a digital network with two data buses, a read and a write bus, by means of a differential transmission system, with a hybrid connection topology, which brings together the double bus and ring-shaped topologies.

Therefore, the first terminal where the ring is open is in charge of generating the empty frames, which are then transferred by the write bus, so that the frames are filled in by the terminals as they go through the write bus, including the first terminal. When the frame has passed through the whole write bus and it arrives at the terminal on the end of the network, this last terminal is self-configured into a closed ring arrangement, so that the write bus output is connected to the read bus input. This is the point where the read bus starts and the frames pass through the terminals that read the information required from these frames, thus enabling the communication between the different terminals.

So, each terminal can update determined fields in the frames transferred by the write bus and it can also read any field on the frames transferred by the read bus.

When the frames reach again the open end of the first terminal (or the terminal in charge of generating these frames), the frames are lost.

Therefore, a very robust configuration is achieved, since if there is a failure in any connection, two networks operating separately will be automatically established to continue to operation, enabling the transmission of data among the different terminals participating in the said process, so that the terminal that is not receiving frames from the write bus will be self-configured as first terminal, generating empty frames, while the terminal that is not receiving frames through the read bus will connect the output of its write bus to the input of the read bus, self-configuring itself as the last terminal in the topology.

The read and write buses are composed by a pair of cables due to the use of differential signalling. This type of signalling minimises the power required for the transmission, increasing the immunity to noise, while reducing the level of wiring radiation.

Each terminal is connected to another terminal—either the next or the previous terminal—through a UTP cable, which contains four twisted-pair-cables, so that a pair is used for the write bus and another one for the read bus, remaining free two twisted pairs, which allow the expansion of the system possibilities, such as access to the Internet, video inputs/outputs to any of the cited terminals, as well as the bridging of the network connections that simplify its structure, minimising its cost. In addition to UTP cable, quadrifilar telephone cable can be used. The system can also be configured for the temporary multiplexing of the write and read buses, so that only a twisted pair is required to interconnect terminals. In this case, bifilar telephone cable can also be used to connect terminals. Finally, the terminals can be interconnected with plastic or glass optical fibre, through a wireless or an electrical network, adjusting the services available to the bandwidth of the interconnection procedures used among terminals in each case.

The frames transmitted through the said read and write buses are structured as follows: they are divided into a header, a control field and different transmission channels for music, voice, image and data, depending on the bandwidth of the cable used, so that the control field is composed by the information of the emitting equipment and the corresponding control information, including the type of control message, its recipient and the state of any existing alarms.

So, when a terminal detects its identification number in the corresponding frame, it knows that the control field of this frame is dedicated to it and it is in charge of filling it in with the corresponding information.

The system implementation follows a modular approach, as stated above, so that all of the functions can be obtained through the connection of additional cards to the base terminal. Each base terminal is composed of a PLD card (Programmable Logic Device) that contains a programmable logic device, a main card and an interface card. An expansion card can be connected when more music and/or video channels are needed; as well as a remote control and alarm card when the system requires these functions.

The PLD card contains a programmable logic device that is in charge of managing and supervising the operation of all other cards through a series of associated connectors, enabling the programming of the card through a PC connection port or memory card.

The main card is directed to provide the basic functions to any type of network according to the invention, offering the capacity to hold a piped music channel while listening to a different channel, fulfil voice communications requirements, read temperatures and provide calendar-clock functions. For these purposes, the card basically has two A/D and D/A audio converters for the analog-digital and digital-analog conversion of a music and a voice channel, as well as the analog circuits required to treat these signals. In addition, this card incorporates the access circuits and connectors that enable the connection of the abovementioned modules.

Likewise, the main card includes two integrated circuits used to supply the hourly/calendar information, as well as the room temperature of the terminal, incorporating a battery with a recharging system to prevent the loss of hourly information.

A user interface card can be used to configure the different options of the device by means of a system of menus that the user can browse to configure the different music or image channels, transmitting or receiving information, the calls made, while managing the sensors and alarm, remote control, calendar or temperature conditions. Therefore, the card has a display and a keyboard, in addition to a series of piezoelectric buzzers that notify different conditions to the user.

The card can optionally include a radiofrequency and/or infrared transmitter/receiver for the transmission of control data through the said network, as well as the devices required for the establishment of voice communications directly through the terminal. This function can also be performed with the connection of a conventional telephone terminal to the user's card.

Likewise, the module can be complemented by one or more cards for the expansion of various A/D and D/A converters, such as those of the main card and its corresponding audio adaptation stage, in order to increase the number of piped music channels. In addition, a series of converters can be established in the cited expansion card or in an independent card, with their corresponding adaptation stage, in order to enable the input and output of different video channels, a telephone line, connection to the Internet or entryphone line.

Said structure can be complemented with a remote control and alarm card, which will be responsible for the connection of different alarm sensors (such as fire, intruder or flood sensors) with the signals coming from the sensors connected to said card, enabling the remote control or activation of a series of devices through the relays associated to the card.

The communications transmitted through the network can be optionally encrypted and compressed, depending on the program of the programmable logic device.

A module-based communications system is thus achieved, wherein the modules can be interconnected to join multiple functions, at a reduced cost and which can be easily expanded with the abovementioned expansion cards.

DESCRIPTION OF THE DRAWINGS

A set of drawings are added as an integral part of the description in order to provide additional information to the description and for a better understanding of the characteristics of the invention, according to a preferred embodiment of the invention. The set of drawings has an illustrative and non-limitative character, where it is showed.

PREFERRED EMBODIMENT OF THE INVENTION

Figure 1:
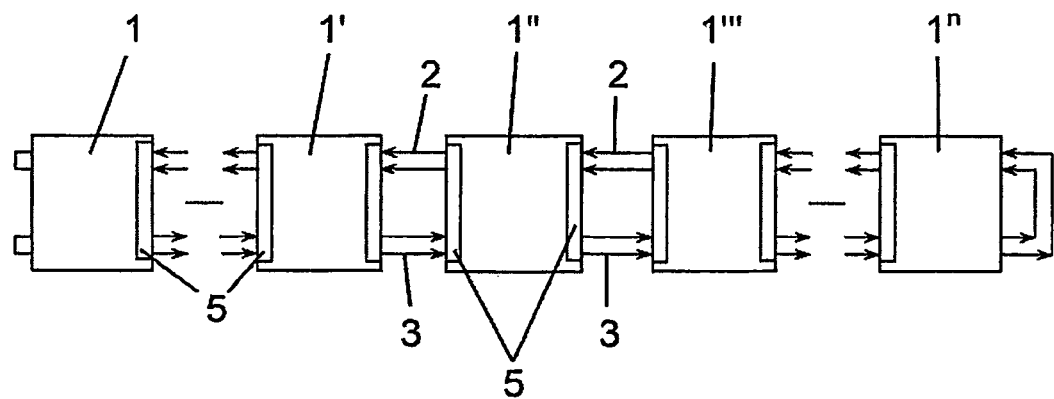
FIG. 1: shows a schematic representation of the connection architecture of the digital communications system for residential, custodial-care environments, office and the likes according to the invention for the interconnection among terminals with UTP cable.

According to the figures, we can see how many different modules (1), (1'), (1") . . . participate in the communications system proposed by the invention, which are interconnected through two buses, a read and a write bus. These buses are communicated one to another by means of a differential transmission system, enabling a greater immunity to noise, thus reducing the power needed for said transmissions, while decreasing the level of electromagnetic radiation.

The read bus (2) and the write bus (3) are both integrated in a single UTP data transmission cable (4), which contains four unshielded twisted-pair-cables, only needing a pair of cables to establish the named read (2) and write (3) buses, respectively, which enables different connection configurations among modules, as explained later on in this document.

In any case, the first terminal (1) of the network is configured in an open ring arrangement and it is in charge of generating empty frames, which are then sent by the write bus (3), as it can be seen in FIG. 1. The fields of these frames are empty, except for the header and control fields, which will be explained later on, so that when the frames pass through the write bus (3), they are filled in by terminals or modules (1), (1'), (1") and once the frame has passed through the write bus and has been filled in by each terminal, it arrives at the network end (1"), where the ring is closed, and the said terminal (1") is configured so that the output of the write bus (3) is connected to the input of the read bus (2). After this point, the frames will travel through different terminals that will read the information needed from these frames, enabling the communication between terminals. Therefore, each terminal can update determined fields of the frames passing through the write bus. Once the frame reaches the open end of the topology, i.e., the first terminal (1) responsible for generating the frame, it will be lost.

This configuration is very robust, as stated above, so that, in case there is a failure in a connection, here there will be a separation between two networks, which will continue to operate independently. In this case, the terminal that is not receiving frames through the read bus (2) will connect the output of the write bus (3) to the input of its read bus (2), self-configuring itself with the last terminal of the close-ring topology.

Figure 2:
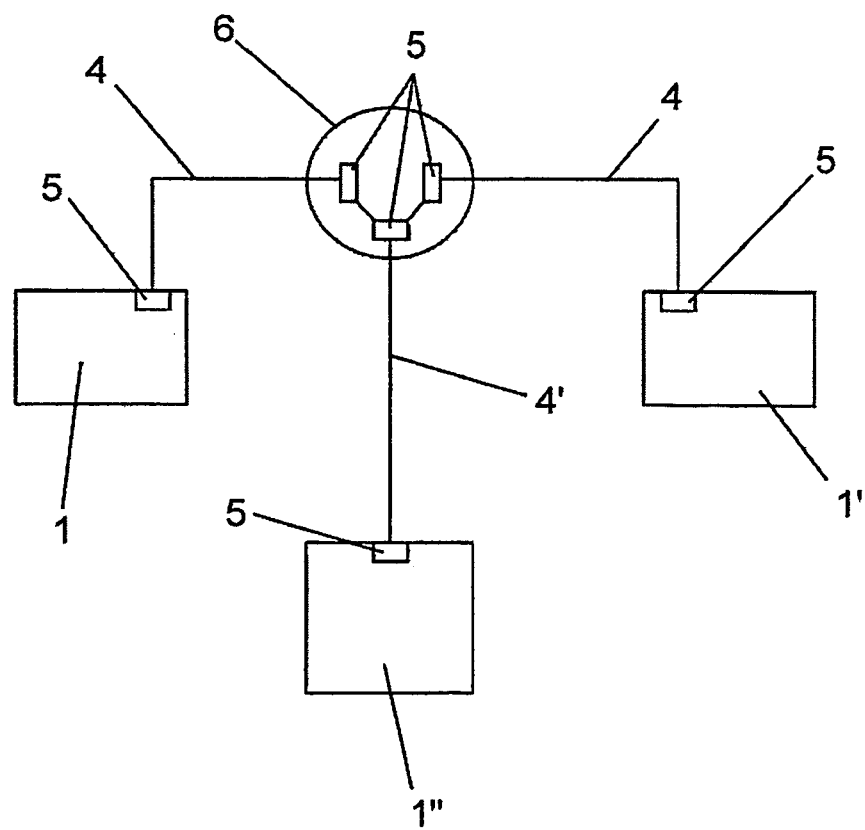
FIG. 2: shows a schematic representation of a second example of a possible configuration of the system shown in the previous figure.

Only two cable pairs of the four available in each UTP connection cable (4) employed for the basic functions of the communications are used, so that the other cable pair will be free and can be used to expand the system's capacity, such as a connection to the Internet, additional video channels, or, with the connectors (5) established in a wall connection box (6), as shown in the example on FIG. 2, using connectors that are identical to those used in the modules (1), (1'), . . . (1″) for the connection of UTP cables (4), whereby a single cable (4') will be needed for the downpipe from the connection box to the equipment. Said cable (4') will use two pairs to establish the communication with a module (1) and the other two to communicate with the next module (1').

The frames transmitted through the said read (2) and write (3) buses will be structured as follows: they will be divided into a header, a control field and different transmission channels for music, voice, image and data, depending on the bandwidth of the cable and system used, so that the control field will be composed of the information of the emitting equipment and the corresponding control information.

Therefore, when a terminal (1), (1'), . . . (1"), detects its identification number in the corresponding frame, it knows that the control field of this frame is dedicated to it and it is in charge of filling it in with the corresponding information.

Figure 3:
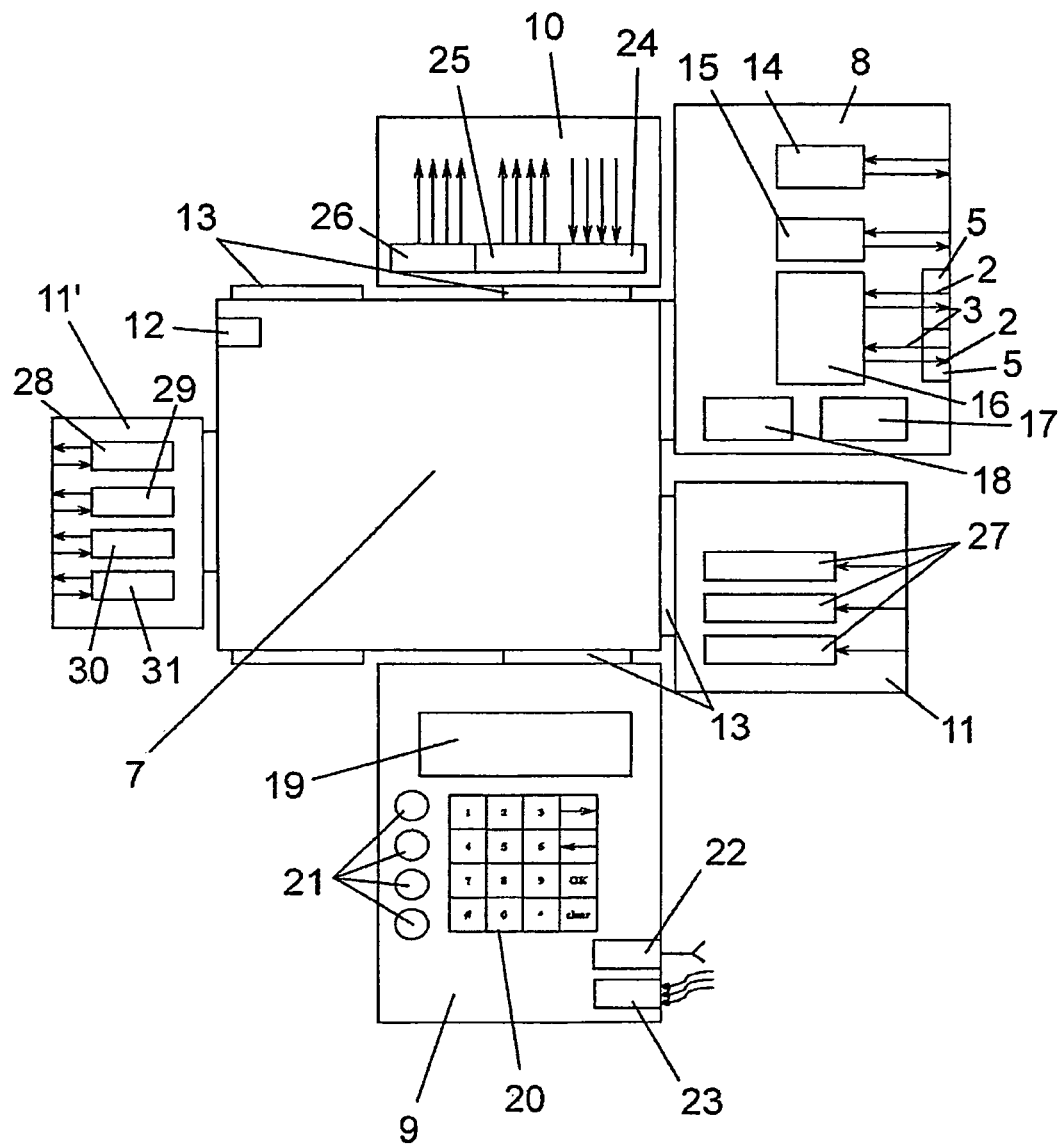
FIG. 3: shows a schematic representation of the different elements that participate or can participate in a module or terminal.

If we return to the terminals or modules (1), (1'), . . . , (1"), these will be structured with a PLD card (7), a main card (8) and a user interface card (9), as shown on FIG. 3, with the additional incorporation of remote control and alarm cards (10) and one or more expansion cards (11).

The PLD card (7) contains a programmable logic device that is responsible for the management and supervision of the operation of all other cards. Said card contains a port (12) that is used to program the card with a PC and a slot to program the card with a memory. In addition, it includes an oscillator, a push-button to initialise the system, a regulator system to power the card and other external cards, as well as a set of connectors (13) that enable the connection of other cards, among other elements.

The main card (8) incorporates two A/D and D/A audio converters (14) and (15), responsible for the analog-digital and digital-analog conversion of a music and a voice channel. Likewise, this card includes the analog circuits required to treat the audio signal before it reaches the converter's input (14), (15), as well as the analog circuits that treat an audio signal at its output. In the case of the music channel, the audio output circuit has a double output, a line output to feed the line input of any amplifier and an amplified signal that can be used to feed a speaker directly, which would be included in the same terminal. Likewise, the voice channel would also have a double output, one for the telephone's receiver and another output for hand's free systems.

In addition, the main card (8) includes the connectors (5) for the UTP cable (4) used to connect modules, as well as the corresponding drivers (16) associated to the modules.

The card (8) has two integrated circuits (17) and (18) that provide hourly/calendar information, as well as temperature readings, respectively, with the existence of an NiCd battery with a recharging system that prevents the loss of hourly information.

This card is designed to avoid the effects of potential electromagnetic interferences, incorporating ferrites that filter the cable inputs and outputs, with a large earth plane, thus reducing the distance between components to avoid the radiation and presence of interference, while incorporating testing points to monitor all communication lines with the programmable logic device (7).

The user's interface card (9) includes a display (19) and a keyboard (20), as well as a series of piezoelectric buzzers (21), which allow the user to configure different system options and receive notifications of different conditions. The system has a series of menus that the user can browse to configure the different music and/or video channels transmitted or received, make calls, call waiting, call listening, call forwarding, fulfil entryphone functions, external calls, connect to the Internet, etc.

The user interface card (9) can also include a radiofrequency (22) and/or infrared (23) transmitter/receiver for the transmission of control data through the said network, as well as the devices required for the establishment of voice communications directly through the terminal. This function can also be performed by the connection of a conventional telephone terminal to the user's card.

The said structure can optionally have a remote control and alarm card (10), with ports (24) for the connection of various alarm sensors, such as, for example, fire, intruder or flood sensors, as well as ports (25) for the activation of remote control alarms and ports (26) for the activation of external loads. Optocouplers that offer galvanic isolation will be used to activate the electric loads through relays in order to prevent any damage to the programmable logic device.

This remote control and alarm card (10) incorporates an input stage for each sensor, so that different types of sensors available in the market can be adapted to the system, being able to check all signals shared with the programmable logic device with testing points.

Optionally, modules or terminals (1), (1'), . . . (1") can include one or more expansion cards (11), with a series of A/D D/A converters (27), similar to those of the main card (8), with the corresponding audio adaptation stage, as required to expand the number of piped music channels. Likewise, a series of converters (28), (29), (30), (31) can be established in the said expansion card (11) or in other independent expansion cards (11'), with their corresponding adaptation stage to enable the input and output of different video channels, a telephone line, connection to the Internet or entryphone line.

Therefore, the audio, video, etc. signals can be fed through any terminal (1), (1'), . . . , (1"), being able to select the said signal from any other network terminal.

The invention claimed is:

1. A digital communications system for residential, custodial-care environments, and offices for integrating different communications services within a single network, the system comprising a set of terminals forming a fault tolerance ring network that are interconnected through data transmission cables including a read bus and a write bus, each terminal comprising:
a PLD (programmable logic device) card comprising a programmable logic device for managing a series of cards coupled to the PLD card, a port to program the PLD card with a personal computer (PC), a slot to program the PLD card with a memory, a regulator system to power the card and the series of cards coupled to the PLD card, and connectors for connecting the series of cards to the PLD card, the series of cards comprising:
a main card comprising:
A/D and D/A audio converters coupled to the read and write busses;
connectors for interconnecting the terminals with the data transmission cables;
analog circuits that treat an audio signal before it reaches an input of the audio converters;
analog circuits that treat an output signal;
a double output music channel having a line output to feed a line input of an amplifier and an amplified output to feed a speaker;
a double output voice channel having an output for a telephone receiver and another output for hand's free systems;
two integrated circuits for providing hourly and calendar information, and temperature level information; and
a recharging system that prevents loss of hourly information information;
a user interface card including a display, a keyboard, and piezoelectric buzzers for configuring system options and receiving notification of conditions;
an expansion card for input or output of audio, video, Internet, telephone line or entryphone line signals; and a remote control and alarm card for activating external loads and alarms, and for gathering signals from sensors.

* * * * *